United States Patent
Popelek et al.

(10) Patent No.: US 6,751,381 B1
(45) Date of Patent: Jun. 15, 2004

(54) EMBODYING AMPLITUDE INFORMATION INTO PHASE MASKS

(75) Inventors: Jan Popelek, Fremont, CA (US); Joshua E. Rothenberg, Palo Alto, CA (US)

(73) Assignee: Teraxion Inc., Quebec (CA)

( * ) Notice: Subject to any disclaimer, the term of this patent is extended or adjusted under 35 U.S.C. 154(b) by 217 days.

(21) Appl. No.: 10/154,505

(22) Filed: May 24, 2002

(51) Int. Cl.$^7$ ................................. G02B 6/34
(52) U.S. Cl. ..................... 385/37; 385/10; 359/569
(58) Field of Search ................ 385/7, 10, 12, 385/37, 39, 42; 372/6, 27, 96; 359/569

(56) References Cited

U.S. PATENT DOCUMENTS

| | | | | |
|---|---|---|---|---|
| 5,881,188 A | * | 3/1999 | Starodubov | 385/37 |
| 5,982,963 A | * | 11/1999 | Feng et al. | 385/37 |
| 6,307,679 B1 | * | 10/2001 | Kashyap | 359/569 |
| 6,687,435 B2 | * | 2/2004 | Koo et al. | 385/37 |

FOREIGN PATENT DOCUMENTS

| | | |
|---|---|---|
| WO | WO 99/22256 | 5/1999 |
| WO | WO 99/63371 | 12/1999 |

OTHER PUBLICATIONS

Kashyap, Fiber Bragg Gratings, 1999, pp. 55–69, Academic Press, ISBN 0–12–400560–8.

* cited by examiner

*Primary Examiner*—Phan T. H. Palmer
(74) *Attorney, Agent, or Firm*—Fulbright & Jaworski LLP

(57) ABSTRACT

A phase mask, for writing fiber Bragg gratings (FBG) in an optical fiber, adjusts the amplitude and the phase of the FBG, while maintaining a constant mean index of refraction of the fiber in a single pass. Specifically, the phase mask embodies the amplitude information so that the amplitude information is an integral part of the phase mask and preferably cannot be separated from the phase information. A first embodiment employs a reflective or opaque surface, defining a window, on the substrate of a phase mask controlling the amplitude of light passing through the phase mask. Another embodiment employs a polygonal shaped grating region on a clear substrate. A third embodiment interleaves regions of grating and smooth substrate surface. Preferred embodiments employ two areas of gratings with the areas disposed: perpendicularly, out of bandwidth or out of phase, relative to each other or additive.

113 Claims, 4 Drawing Sheets

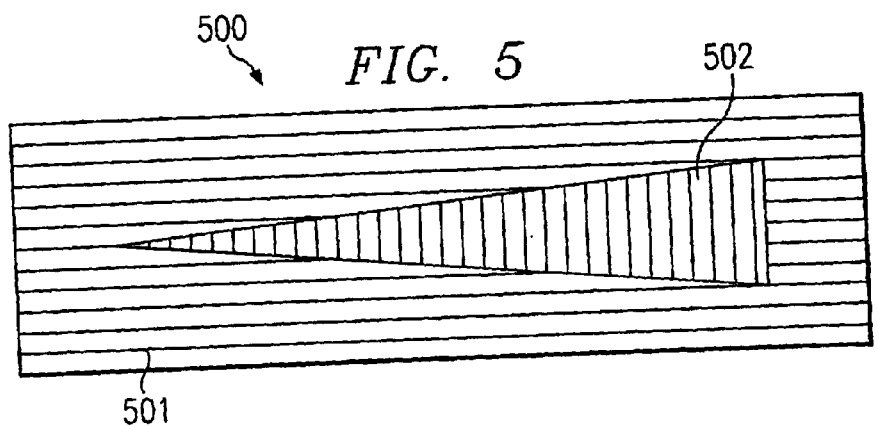
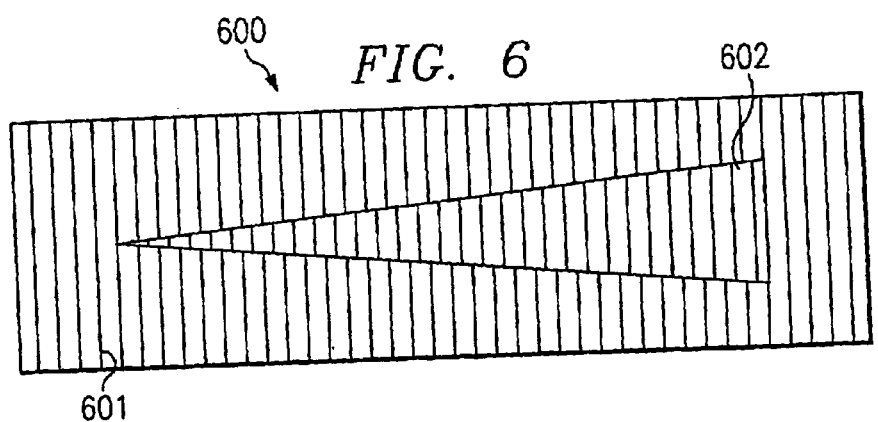
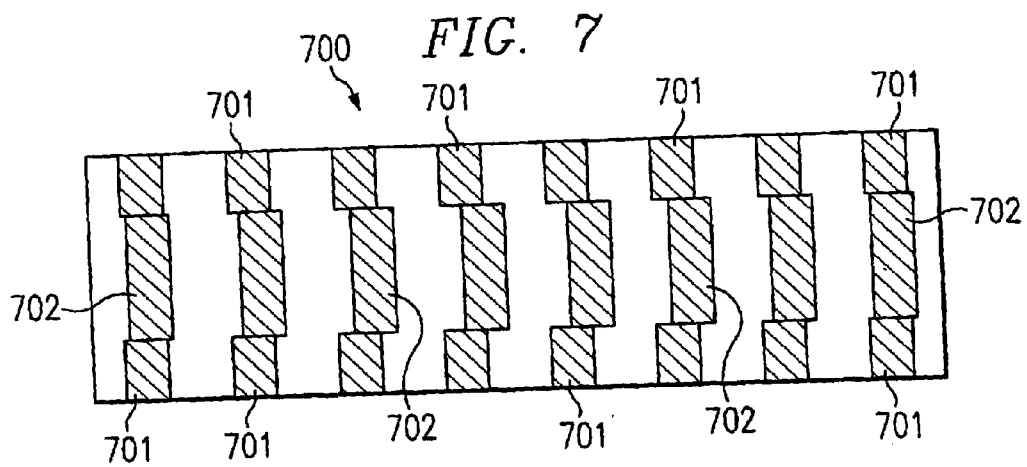

EMBODYING AMPLITUDE INFORMATION INTO PHASE MASKS

RELATED APPLICATIONS

The present application is related to patent application Ser. No. 09/883,081, filed Jun. 15, 2001, entitled "LITHOGRAPHIC FABRICATION OF PHASE MASK FOR FIBER BRAGG GRATINGS", and Ser. No. 09/757,386, filed Jan. 8, 2001 entitled "EFFICIENT SAMPLED BRAGG GRATINGS FOR WDM APPLICATIONS" the disclosures of which are hereby incorporated herein by reference.

TECHNICAL FIELD

The present invention generally relates to fiber optical communication technologies and more specifically to a system and method for embodying amplitude information into phase masks for writing fiber Bragg gratings.

BACKGROUND

Normal optical fibers are uniform along their lengths. A slice from any one point of the fiber looks like a slice taken from anywhere else on the fiber, disregarding tiny imperfections. However, it is possible to make fibers in which the refractive index varies regularly along their length. These fibers are called fiber gratings because they interact with light like diffraction gratings. Their effects on light passing through them depend very strongly on the wavelength of the light.

A diffraction grating is a row of fine parallel lines, usually on a reflective surface. Light waves bounce off of the lines at an angle that depends on their wavelength, so light reflected from a diffraction grating spreads out in a spectrum. In fiber gratings, the lines are not grooves etched on the surface, instead they are variations in the refractive index of the fiber material. The variations scatter light by what is called the Bragg effect, hence fiber Bragg gratings (FBGs). Bragg effect scattering is not exactly the same as diffraction scattering, but the overall effect is similar. Bragg scattering reflects certain wavelengths of light that resonate with the grating spacing while transmitting other light.

FBGs are used to compensate for chromatic dispersion in an optical fiber. Dispersion is the spreading out of light pulses as they travel on the fiber. Dispersion occurs because the speed of light through the fiber depends on its wavelength, polarization, and propagation mode. The differences are slight, but accumulate with distance. Thus, the longer the fiber, the more dispersion. Dispersion can limit the distance a signal can travel through the optical fiber because dispersion cumulatively blurs the signal. After a certain point, the signal has become so blurred that it is unintelligible. The FBGs compensate for chromatic (wavelength) dispersion by serving as a selective delay line. The FBG delays the wavelengths that travel fastest through the fiber until the slower wavelengths catch up. FBGs are discussed further in Feng et al., U.S. Pat. No. 5,982,963, which is hereby incorporated herein by reference in its entirety.

In some applications it is desired to make FBGs which have multiple spectral bands of operation (channels). One method to make such devices is to further modulate the FBG with a period longer than the underlying grating period. This method of providing a superimposed structure or superstructure may sometimes be referred to as sampling. This super-structure may involve either modulation of the FBG amplitude or period (or phase). Examples of these type of FBG devices are described in the U.S. patent application Ser. No. 09/757,386, entitled "EFFICIENT SAMPLED BRAGG GRATINGS FOR WDM APPLICATIONS".

FBGs are typically created in one of two manners. The first manner is known as the direct write FBG formation In this manner two ultraviolet beams may be impinged onto the fiber, in such a manner that they interfere with each other and form an interference pattern on the fiber. The interference pattern comprises regions of high and low intensity light. The high intensity light causes a change in the index of refraction of that region of the fiber. Since the regions of high and low intensity light are alternating, a FBG is formed in the fiber. The fiber or the writing system is moved with respect to the other such that the FBG is scanned, or written, into the fiber. Note that the two beams are typically formed from a single source beam by passing the beam through a beam separator, e.g. a beamsplitter or a grating. Also, the two beams are typically controlled in some manner so as to allow control over the locations of the high and low intensity regions. For example, Laming et al., WO 99/22256, which is hereby incorporated herein by reference in its entirety, teaches that beam separator and part of the focusing system is moveable to alter the angle of convergence of the beams, which in turn alters the fringe pitch on the fiber. Another example is provided by Stepanov et al., WO 99/63371, which is hereby incorporated herein by reference in its entirety, and teaches the use of an electro-optic module, which operates on the beams to impart a phase delay between the beams, which in turn controls the positions of the high and low intensity regions.

The second manner for creating FBGs uses a phase mask. The phase mask is a quartz slab that is patterned with a grating. This grating is typically a row of finely spaced parallel lines, or grooves, with a duty cycle typically in the forty to sixty percent range. These lines are usually etched lithographically onto the surface of the quartz slab (mask). The mask is placed in close proximity with the fiber, and ultraviolet light, usually from an ultraviolet laser, is shined through the mask and onto the fiber. As the light passes through the mask, the light is primarily diffracted into two directions, which then forms an interference pattern on the fiber. At this point, the FBG is formed in the same way as the direct write manner. See also Kashyap, "Fiber Bragg Gratings", Academic Press (1999), ISBN 0-12-40056-8, which is hereby incorporated herein by reference in its entirety.

Each manner has advantages and disadvantages when compared with each other. For example, the phase mask manner, is relatively inflexible, as changes cannot be made to the mask. However, since the phase mask is permanent, the phase mask manner is stable, repeatable, and aside from the cost of the mask, relatively inexpensive to operate. On the other hand, the direct write manner is very flexible, and can write different gratings. However, this manner is less repeatable and is costly to operate.

When making an FBG there is a need to combine two pieces of information. A phase profile, provided by variation of the period, commonly referred to as chirp, of a phase mask and an amplitude profile (i.e. the magnitude of the index modulation of the core of the fiber) provided by varying the light exposure of the mask or other FBG creation mechanism. For complex FBG designs this creates an opportunity for errors. Assuming a perfect phase mask, manufactured in accordance with prior art methods, a phase mask only has a part of the information needed to write an FBG on a fiber, the phase information. The other information necessary for proper function of the FBG is the amplitude, which provides a profile for magnitude of a spatially varying oscillatory index modulation of the grating that is written into the core of the fiber.

In the prior art, the amplitude information is provided by separate data used to modulate the laser beam intensity or by other methods, such as rapidly vibrating the mask, fiber, or aiming mechanisms of the laser beam. Thus, in the prior art the amplitude information is controlled separately from the phase information that is incorporated into the mask. Therefore, great care has previously been required such that variation of the amplitude is controlled during the FBG writing process so as to be precisely spatially synchronized with the phase information incorporated into the mask in order to insure proper function of the grating. In addition, in the prior art, changes in the FBG amplitude made by modulating the laser intensity may cause changes in the average index of refraction of the fiber, which effectively leads to errors in the intended chirp.

One prior art attempt to combine phase and amplitude information for FBGs uses two masks. A phase mask and an amplitude mask are stacked or sandwiched. A window is cut out of a chrome layer of the amplitude mask. The light beam is focused through the amplitude mask and thus through the phase mask, focusing on the core of the fiber. This is undesirable as modulation of the mean index of refraction modifies the desired FBG. Ideally, a uniform mean index of refraction with symmetric oscillations of the index around the mean is needed to result in properly functioning FBGs. Therefore, under this prior art method a second pass of the laser beam after removing both masks and replacing the amplitude mask with a complementary mask amplitude pattern is necessary to equalize the mean index of refraction of the fiber. This method suffers from insufficient accuracy as a result of inherent inaccuracies associated with a multiple pass writing process.

It is also known in the art, for example as disclosed in Hill, U.S. Pat. No. 5,367,588, that the period of the grating on the mask preferably be chosen to be twice the desired period of the fringes in the FBG. This is because the fiber Bragg grating is formed by interference between the +1 and −1 orders diffracted from the mask grating. The etch depth of the mask grating is chosen to suppress the zeroeth order. Accordingly, it is understood that any phase shift present in the mask is effectively doubled upon writing into the FBG. Thus, if a phase shift of $\pi$ or a half-period is desired in the FBG, then a phase shift of $\pi/2$ or a quarter-period is required in the mask grating.

Another prior art method to combine phase and amplitude information for FBGs uses modulation of the duty cycle, or etch depth, of the grating on the mask to modulate the visibility of the fringes in the transmitted light. This approach suffers from a number of practical difficulties in achieving desired flexibility and accuracy of the amplitude profile.

Using interference between two FBG fringe patterns to control fringe amplitude, referred to as apodization function, is disclosed in Kashyap, U.S. Pat. No. 6,307,679. However, the two component FBG patterns are written sequentially rather than simultaneously. As a result, the prior art method disclosed in Kashyap suffers from the problem that the longitudinal position of the fiber must remain very precisely controlled, generally on the scale of 1 nm, between the sequential writing passes of the two FBG patterns.

SUMMARY OF THE INVENTION

To solve the problems associated with separate amplitude and phase information masks, it is desirable to incorporate both parts of this complex function, the amplitude, and the phase function (variation of the grating period or chirp), into a single mask Thereby combining the phase and amplitude information so that it cannot be separated; eliminating a source of inaccuracy for FBGs.

The present inventive phase mask for writing FBGs in an optical fiber adjusts the mean index of refraction of the fiber that is being written on in a single pass. Specifically, the inventive phase mask embodies amplitude information into a phase mask so that the amplitude information is integral with the phase information. A first embodiment preferably employs an opaque surface layer that defines a window on the substrate of the phase mask to control the amplitude of the light passing through the phase mask. A second embodiment preferably employs a polygon shaped grating region on a smooth, clear substrate. A third embodiment preferably interleaves regions of grating and smooth substrate surface.

One preferred embodiment employs two areas of gratings with the grating in each area oriented perpendicularly. Another preferred embodiment employs two areas of gratings with one area disposed out of bandwidth for devices associated with the fiber optic system. A third preferred embodiment employs two areas of gratings with the areas disposed out of phase by a predetermined amount or with opposite phases, relative to each other.

Another preferred embodiment sums functions embodied by gratings disposed on a substrate to write a complex function in the fiber Bragg grating. One embodiment employs two halves of the complex function on left and right, and/or top and bottom halves of the phase mask.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 5 diagrammatically depicts a perpendicularly corrugated embodiment of the inventive mask;

FIG. 6 diagrammatically depicts an out of band, corrugated embodiment of the inventive mask;

FIG. 7 diagrammatically depicts an out of phase, corrugated embodiment of the inventive mask;

DETAILED DESCRIPTION

Figure 1:
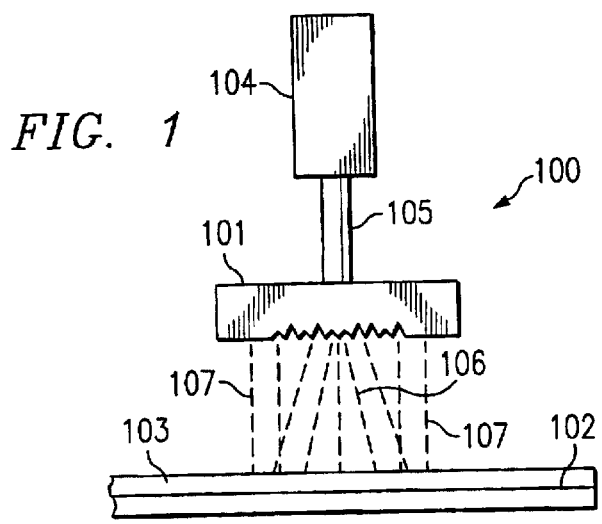
FIG. 1 diagrammatically depicts an example of an arrangement to write a fiber Bragg grating (FBG) into a fiber using the inventive mask.

FIG. 1 depicts an example of system 100 configured to use inventive mask 101 to write a FBG into core 102 of fiber 103. Light source 104, e.g. an ultraviolet laser, provides input beam 105. Phase mask 101, configured as described below, provides both phase and amplitude information to fiber core 102. Thus, light exiting mask 101 may include region 106 that results from mask corrugations, which may be chirped (have variation in the grating period). Alternatively, a FBG may have multiple spectral bands of operation or channels provided by sampling, further modulation of the FBG with a period longer than the underlying grating period, described in aforementioned U.S. patent application Ser. No. 09/757,386, entitled "EFFICIENT SAMPLED BRAGG GRATINGS FOR WDM APPLICATIONS". Regardless, region 106 preferably generates positive and negative first diffracted orders of light which interfere to establish refractive fringes in fiber core 102. Region 107 of light existing mask 101, unaffected by mask corrugations, contributes a change in the average index of fiber core 102. This allows an FBG to be written to fiber 103 using a single mask 101 and a single pass of laser 104.

Figure 2:
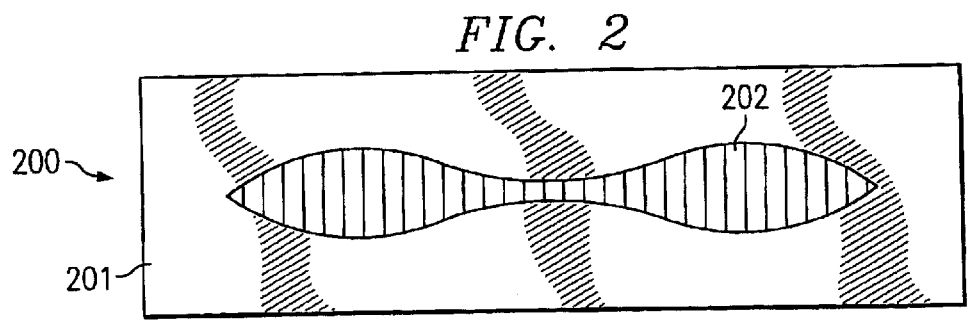
FIG. 2 diagrammatically depicts an opaque surface embodiment of the inventive mask.

In a first embodiment, shown in FIG. 2, to fix the phase and amplitude information together, phase mask 200 is covered with an opaque layer, preferably chrome layer 201, defining a phase mask window 202. This eliminates one prior art problem encountered when using two separate masks, one with phase information and the other with a chrome window to provide amplitude information as discussed above. The relative positioning errors of two such masks are eliminated, by placing the chrome layer 201 directly on the quartz substrate of the phase mask 200 according to the present invention.

Figure 3:
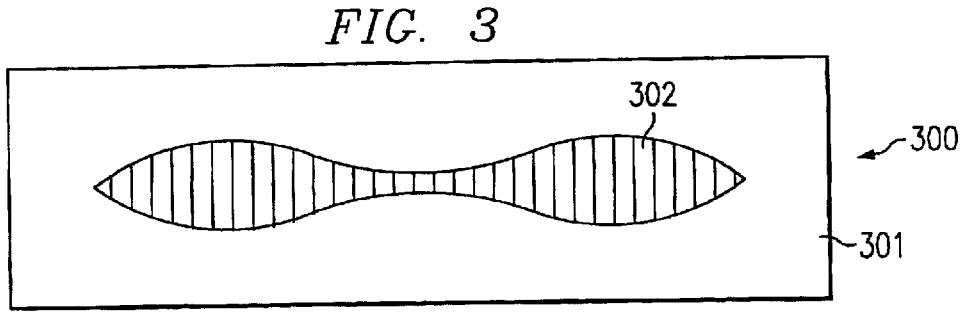
FIG. 3 diagrammatically depicts a clear substrate embodiment of the inventive mask.

Turning to FIG. 3, to address undesirable variation of the mean index of refraction it is necessary to ensure that the laser dose is constant over the entire FBG. Without the aforementioned chrome layer all of the light energy passing through mask 300 strikes the fiber core, so the dose of laser light, and consequently the mean index of refraction inside the core of the fiber, is constant. The desired variation profile of FBG amplitude is achieved by varying the fraction of the writing beam passing through corrugated portion 302 of phase mask 300. This creates fringes in the fiber core of a desired amplitude profile. The remainder of the writing beam is passed through uncorrugated portion 301 of mask 300. This equalizes the mean index of refraction in the fiber core. Thus, the desired variation in grating amplitude is achieved with a constant dose of laser light to the fiber, which ensures a uniform mean index of refraction in the FBG.

Preferably, the lateral dimensions of the grooves or corrugations in mask 300 are modulated according to the desired amplitude profile of the grating. This creates area 302 of the phase mask filled with corrugated surface surrounded by smooth substrate 301, or vice versa, an area of smooth surface surrounded by the corrugated surface. This creates window 302 having an amorphous polygonal shape in which the substrate is corrugated. This shape may not define a true polygon but rather a generally amorphous two dimensional outline, as shown in FIG. 3.

The light passing through corrugated portion 302 of the mask 300 creates a grating modulation in the fiber of an amplitude proportional to the laser dose, or for a uniform illuminating writing beam, proportional to the area of corrugation portion 302. By allowing the remaining portion of the light to go through smooth uncorrugated portion 301 of the quartz substrate of the phase mask 300, a uniform total light dosage and thus a uniform mean index of refraction is assured. In other words second embodiment phase mask 300 has unequal length grooves 302 surrounded by smooth, clear substrate 301. So light passing through corrugated (grooved) portion 302 of mask 300 will create an interference pattern and light passing through outside of the corrugated area will only equalize the mean index of refraction of the fiber core. The writing laser beam strikes either grooves or smooth surface. The ratio of the corrugated portion to the smooth portion determines the FBG fringe amplitude, but the total laser dose is constant. Therefore, since light is not blocked, the total dose is constant, the mean index of refraction is constant and the amplitude of the fringes at a given location along the fiber is related to the corresponding width of the corrugated area 302 at that location, as defined by the grating's line lengths. To create an FBG in a fiber using phase mask 300, a constant intensity laser beam is passed across the mask 300 onto a fiber. The portion of the light that hits the corrugated area 302 creates the FBG and the light that falls outside the corrugated area on clear smooth quartz substrate 301 equalizes the mean index of refraction.

Embodiment 300 may be modified by using focusing optics. Utilization of cylindrical optics that focus the laser beam transversely to the core of the fiber may relax necessary precision of alignment and manufacturing of the mask by using a wider laser beam to illuminate a wider phase mask. Generally, only the portion of the beam that illuminates the fiber core contributes to the FBG fringes or to the average index change. Thus, since the illuminated mask area is typically much larger than the fiber core, to fully utilize the available laser power in writing the FBG, the beam is preferably focused through the mask onto the fiber core.

Figure 4:
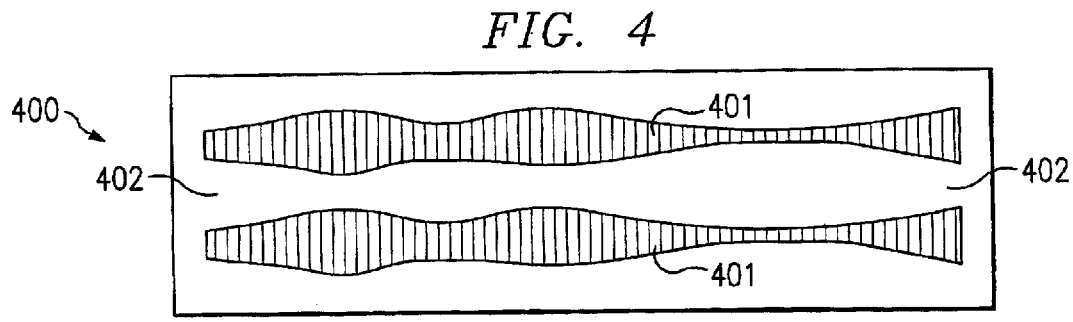
FIG. 4 diagrammatically depicts an interleaved embodiment of the inventive mask.

The laser beam used in writing an FBG can be quite small, the tolerances for the lateral dimensions of the corrugated area are very fine and the tolerance for positioning the laser beam exactly in the center of a phase mask on an axis of a corrugated slit is also very fine. With attention directed to FIG. 4, mask embodiment 400 is depicted employing interleaved corrugated area 401 and uncorrugated area 402. The preferably wider combined areas 401 and 402 alleviate sensitivity to correct positioning of the writing laser beam. Embodiment 400 preferably only requires precise alignment of only the fiber core and the laser beam, which may be focused. Accordingly, alignment of phase mask 400 to both the fiber and the writing beam is much less stringent. The resulting required grating line lengths of the interleaved pattern is preferably determined in main part by writing beam size and the precision of a mask holding apparatus. That is, the pattern grating line lengths are preferably great enough to insure that the writing beam is entirely contained within the patterned region. Additionally, embodiment 400 does not require focusing optics. This allows direct writing with a laser beam without using a cylindrical focusing lens. Although for the purposes of increasing the dose and decreasing the writing time, an alternative form of embodiment 400 entails the use of a focused writing beam. The beam may be focused onto the fiber, or alternately may be collimated or focused with the laser focal region closer to or further away from the mask than the fiber core. A tighter focused or smaller writing beam preferably decreases FBG writing time, but requires more precision of alignment In the embodiments of FIGS. 2, 3 and 4 light passed through said substrate has an amplitude modulation of fringes determined, at least in part, by intensity of the light and transmittance of the substrate. The reflectivity or transmission coefficient of the smooth area of the substrate and the corrugated area of the substrate of a phase mask might be slightly different. Even a few percent difference between transmission through these two areas will create undesired effects in the fiber grating, such as nonuniform laser dose and thus nonuniform mean index of refraction in the fiber core. Therefore, to mitigate uneven transmissions through the smooth and corrugated areas of the present phase mask, the smooth area may be corrugated in such a manner as to not interfere with the FBG fringe amplitude, but preferably only to equalize the transmission coefficient through the substrate so as to ensure uniform laser dose of the fiber. This preferably provides a uniform transmission coefficient to all light passing through the phase mask. This corrugation scheme is employed in a preferable manner by embodiments illustrated in FIGS. 5 and 6.

In embodiment 500 depicted in FIG. 5, area 501 outside of phase mask portion 502 can be corrugated perpendicularly to phase mask portion 502. The corrugations have the same period with the same depths, perpendicularly oriented relative to corrugations 502, generally along the direction of the fiber axis, so that both corrugation areas have the same transmission coefficient. The perpendicularly oriented corrugation creates interference patterns that are perpendicular to the axis of the fiber and therefore, have no effect on the function of the FBG. Only the corrugation along the fiber axis contributes to the Bragg reflectivity in the FBG. Thus, the perpendicularly oriented corrugation in area 501 preferably only serves to equalize the laser dose to the fiber over the length of mask 500.

Alternatively, as depicted in embodiment 600 of FIG. 6, area 601 outside phase mask area 602 is corrugated with a slightly different period of grooves, or pitch. This causes the resonance frequency of the light passing through mask 600, outside of phase mask area 602 to be shifted out of band for a device employing the FBG. Such devices typically operate in a wavelength band with a bandwidth of a few nanometers. A slight variance of the corrugation period of, for example, one percent, will result in a FBG with reflectivity significantly out of the bandwidth of interest, so that it will not interfere with the desired function of such a device. Thus, the part of the writing beam which illuminates the mask region with the slight shift of groove period will not affect the amplitude of the grating fringes in the relevant spectral region of interest of the device. However, the beam portion passing through mask portion 601 will preferably illuminate the fiber, and thereby preferably ensure uniform dose and in turn a uniform mean index of refraction.

A further alternative method of mask design which can be used to vary the FBG fringe amplitude while maintaining a constant dose and mean index of refraction in the fiber core is to use phase properties of the light fringes themselves. To describe this method mathematically it is useful to define the index of refraction of the core of the fiber which constitutes the FBG:

$$n(z)=n_0+Re\{\Delta n(z)\exp[i(2\pi z/\Lambda_g+\phi(z))]\} \quad (1)$$

where $n_0$ is the mean index of the fiber core, $\Lambda_g$ is the constant central period of the FBG index fringes, $\Delta n(z)$ is the amplitude of the FBG fringes, and the phase $\phi(z)$ determines the period and variation of the period of the fringes as a function of position along the fiber. It should be noted that the corresponding mask period is $2\Lambda_g$ and the mask phase is one half of the fringe pattern phase $\phi(z)$. Thus the variation of both the amplitude and period of the FBG index fringes can be described by the complex index function:

$$Y(z)=\Delta n(z)\exp[i\phi(z)] \quad (2)$$

Any desired complex function such as Y(z) can be expressed as a sum of two or more different complex functions which have equal and uniform amplitudes but different phases. Such a substitution allows us to create an arbitrary amplitude profile in the FBG fringes by illuminating equal and constant amplitude regions in the mask, which generate two or more complex intensity functions that sum in the fiber core to give the desired total index fringe pattern which varies in both amplitude and phase.

For example, a nonuniform amplitude function, such as a Gaussian function, can be described as the sum of two complex and uniform amplitude functions. To obtain the function Y(z), two complex functions with uniform amplitude, A(z) and B(z), are written and their sum yields Y(z). A phase mask can thus embody all the information for a complex function with nonuniform amplitude by summing up two complex functions with uniform amplitude but different phase properties. This concept can be expressed as:

$$Y(z)=\Delta n(z)\cdot e^{-i\phi(z)}=A_0\cdot e^{-i\alpha(z)}+B_0\cdot e^{i\beta(z)} \quad (3)$$

Where:

$$\alpha(z)=\phi(z)+\delta(z) \quad (4)$$

$$\beta(z)=\phi(z)-\delta(z) \quad (5)$$

Y is the desired total complex index function, and A and B are functions representing two regions on the mask. For example, the two regions could comprise the top and bottom, left and right, or central and peripheral parts of the mask Additionally, these two regions may be interwoven so that regions A and B are each separated into many, perhaps small, sub-regions, which are alternated or interleaved in some other fashion. For the case of uniform and equal amplitude composite functions A and B, we have $A_0=B_0$, and the fringe amplitude in the FBG can be written as:

$$\Delta n(z)=A_0\cdot(e^{-i\delta(z)}+e^{i\delta(z)})=2A_0\cos\delta(z) \quad (6)$$

and thus one chooses the two patterns A and B to have a phase differential given by $$\delta(z)=\arccos\left(\frac{\Delta n(z)}{2A_0}\right) \quad (7)$$

$A_0$ and thus the dose is preferably chosen such that $2A_0$ is equal to the maximum value of $\Delta n(z)$ over the entire FBG.

In the phase difference approach described above, a desired complex function representing the fringe pattern in the FBG, according to Equation (1), is selected This complex function has a phase and an amplitude. The complex function can be formed out of two components, each of which has a uniform amplitude. Although these two component functions have uniform amplitude, the phases are chosen to differ by $2\delta(z)$, in such a manner for example as given in Eq. (7), that at locations where higher amplitude of the fringes is desired, these two functions add constructively. Where lower amplitude of the fringes is desired, the function will add destructively, subtracting from each other so that the resulting total fringe amplitude can be small or zero. The average phase of the two functions is given by the desired fringe phase $\phi(z)$ in Eq. (1), as described in Eqs. (4) and (5). The phases of each of the two FBG component functions are then halved to obtain the phase of the corresponding mask phases describing the corrugation in the two respective mask regions.

In the present invention, the difficulty associated with the sequential multiple component FBG pattern writing of Kashyap, U.S. Pat. No. 6,307,679, discussed above is eliminated by incorporating both component patterns into the mask as described below. In the present invention, a single writing pass with one or more beams simultaneously write both intensity patterns into the fiber core. Thus, the FBG index modulation patterns of both components are preferably written with the relative phase accuracy given by the longitudinal positional accuracy of a lithographically prepared phase mask. This accuracy can be well below 1 nm for current lithographic tools, especially over the small areas required to obtain the appropriate combination of the two patterns. The accuracy of corrugation placement may be further improved with techniques described in previously referenced U.S. patent application Ser. No. 09/883,081, "LITHOGRAPHIC FABRICATION OF PHASE MASK FOR FIBER BRAGG GRATINGS".

Turning to FIGS. 7 through 12, the hatched rectangles shown in FIGS. 7 through 12 are intended to be diagrammatically representative of the grating lines discussed herein. Embodiment 700, depicted in FIG. 7, uses the simultaneous manner described above. In embodiment 700, outer portion 701 preferably has a different phase compared with center portion 702 of mask 700. By tailoring the phase difference between outer portion 701 and inner portion 702 of mask 700 as a function of a position along the fiber, the amplitude of the fringes can be established while maintaining the uniform dose over the entire fiber. When illuminated by a uniform beam, the sum of the illuminated grating line lengths of outer out of phase portions 701 preferably equal the illuminated grating line lengths of inner phase mask portion 702 to obtain equal amplitudes of the two functions which sum to give the desired total amplitude. For this phase difference embodiment, and the subsequent embodiments employing the phase difference approach, the average position of multiple corrugation patterns can be determined for a desired phase, $\phi(z)$ in Eq. (1), of the resultant fringe pattern in the FBG as described in Eqs. (4) and (5).

Figure 8:
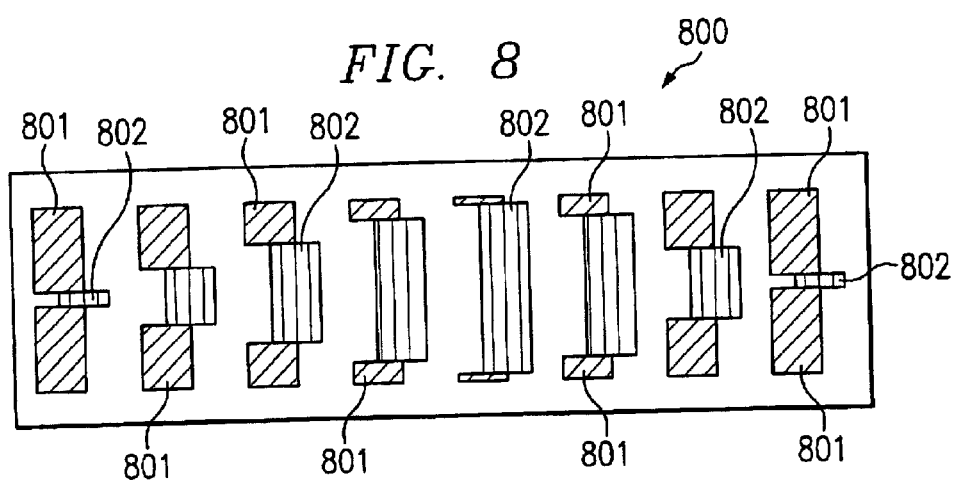
FIG. 8 diagrammatically depicts an opposite phase, corrugated embodiment of the inventive mask.

In another embodiment, phase mask 800 depicted in FIG. 8 uses the same period of corrugations in the two regions, but with a constant $\pi/2$ phase differential between the two regions of the phase mask portions 802 and 801. Therefore, the intensity fringe patterns in the fiber core resulting from portions 801 and 802 have a phase difference of $\pi$, and thus have opposite phase. For example, if the amplitudes are related to the length of the grating lines in each region and if the laser illumination is uniform, the fringe amplitudes generated by the two regions 801 and 802 should be equal. Thus, the amplitudes should cancel out in the resulting FBG and the resulting FBG fringe amplitude should be substantially zero. If one or the other region has a relatively short grating line length, then nearly maximum amplitude may be obtained. To restate this mathematically, if the amplitudes (grating line lengths) of the two regions, varying along the length of the grating, are $A(z)$ and $B(z)$, then the net FBG amplitude will be the absolute value of their difference $$\Delta n(z) = |A(z) - B(z)| \tag{8}$$

For example, if the regions have equal grating line lengths, A=B, then $\Delta n=0$, and if A or B$\to$0, then $\Delta n$ approaches its maximum. Note that the outer region 801 is comprised of two portions, upper portion and lower portion as shown in FIG. 8, and therefore the amplitude of region 801 is given by the total grating line lengths of region 801 at any point or the sum of the grating line lengths of the two portions. The net amplitude is then given by the difference between the total grating line lengths of regions 801 and 802 at any point along the grating, if they are both uniformly illuminated.

Figure 9:
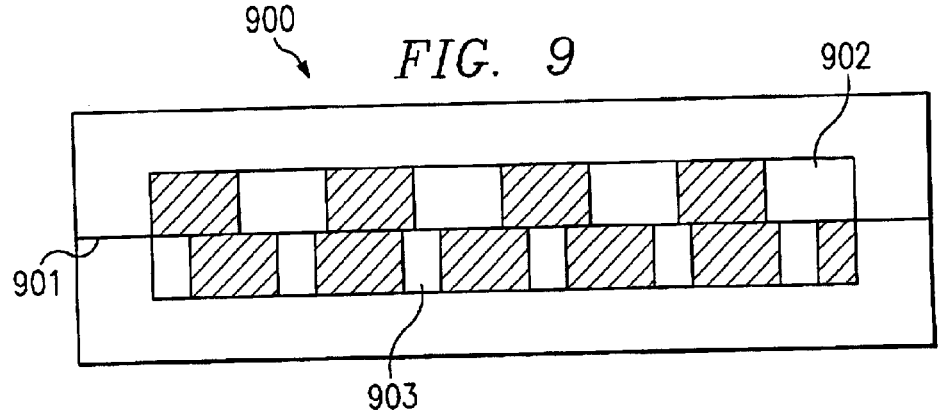
FIG. 9 diagrammatically depicts a sum of complex functions embodiment of the inventive mask.

Turning to the embodiment of FIG. 9, phase mask 900 defines central division boundary or centerline 901 between two halves 902 and 903 of mask 900. When the writing beam is positioned on the centerline of the boundary 901 between left and right, or top 902 and bottom 903 halves of the mask depicted in FIG. 9, the desired amplitude function can be obtained. By tailoring the phase difference between upper portion 902 and lower portion 903 of mask 900 as a function of a position along the fiber, the amplitude of the fringes can be controlled while maintaining the uniform dose over the entire fiber. Preferably, the beam equally illuminates both regions to be able to obtain zero net amplitude. This is similar to embodiment 700, shown in FIG. 7, except that the two regions 902 and 903 are equally split into two portions. In FIG. 7 the regions are split into 3 portions: one is the central region, which comprises the first function, and the other two outer regions combine to make the second function.

Figure 10:
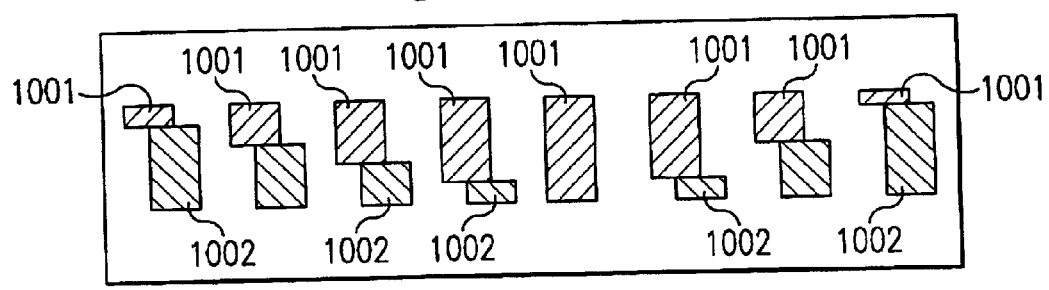
FIG. 10 diagrammatically depicts a constant $2/\pi$ phase shift embodiment of the inventive mask.

Another embodiment is shown in FIG. 10, where use of top and bottom regions is extended to constant $\pi/2$ phase shift mask embodiment 1000. Two corrugation patterns 1001 and 1002, shifted relative to each other, are defined by mask 1000. The relative phase shift between upper pattern 1001 and lower pattern 1002 is constant and equal to $\pi/2$ in the mask, so that the resulting intensity patterns have a $\pi$ phase shift in the FBG. The amplitudes of the two functions are varied by varying the grating line lengths of the two regions. Thus, when the two regions have equal grating line lengths, the resulting net grating amplitude $\Delta n(z)$ is zero as described in equation (8), above, and when either of the regions has relatively small grating line lengths, the resulting amplitude is near maximum.

Figure 11:
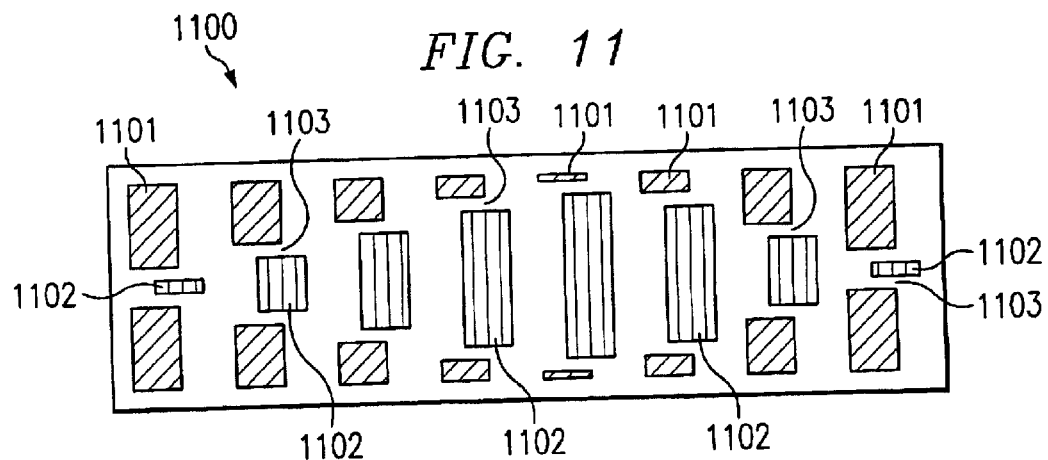
FIG. 11 diagrammatically depicts an embodiment of the inventive mask of FIG. 8 employing gaps between inner and outer figure.

In the phase interference embodiments of FIGS. 7–10, alternative embodiments may call for inclusion of a transverse gap between the regions to optimize the interference of light from the two regions in such a manner as to not adversely affect the desired amplitude and phase of the FBG. Embodiment 1100, an example of the use of such gaps, is shown in FIG. 11, as applied to embodiment 800 of FIG. 8. The inner region 1102 and peripheral regions 1101 are separated by small gaps 1103. Such gaps, if they are uniform along the mask will preferably not alter the desired amplitude function. The gaps may add a small amount of unmodulated laser dose, which should slightly increase the average index of refraction of the core. Advantageously, this will not degrade the desired amplitude or phase as long as the gaps are uniform along the mask. However, such gaps can be made very small so that the least amount of laser dose possible is wasted on changing the average index.

Figure 12:
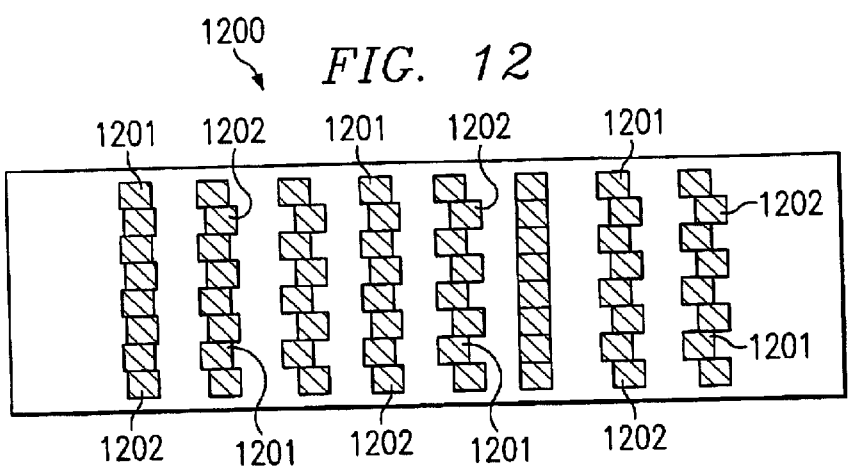
FIG. 12 diagrammatically depicts a repeated interleaved inventive phase mask embodiment employing the sum of complex functions embodiment of FIG. 9.

The two regions in each of the mask embodiments of FIGS. 5 through 11 are preferably equally illuminated to obtain the correct fringe amplitude in the FBG. However, in each of these embodiments it is also possible to interleave many such sub-regions, each of which could have a grating line length much smaller than the writing beam. In such alternative embodiments great precision is not required in equally illuminating the two regions since there are many copies of each region falling within the writing beam. Such mask are fabricated so that the grating line lengths of the sub-regions are equal. Embodiment 1200, an example of this method as applied to embodiment 900 of FIG. 9 is shown in FIG. 12. Mask 1200 is comprised of two regions 1201 and 1202 that have a varying phase difference between them. These two regions 1201 and 1202 are repeated over the mask such that they appear many times within the writing beam area. If the grating line lengths of regions 1201 and 1202 are substantially equal, then the amplitudes of the two constituent functions will also be equal. This embodiment significantly reduces the required alignment precision and uniformity of the writing beam. Again in this embodiment one may find it beneficial to include small gaps between the interleaved regions as discussed above in relation to embodiment 1100.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical phase mask embodying light amplitude information, said phase mask comprising:
   a substrate;
   an opaque surface disposed on said substrate, said opaque surface defining a polygonal window; and
   a diffraction grating defined on said substrate, said grating comprising parallel lines of varying lengths, said lengths defined by said window;
   wherein light passed through said substrate has a modulation amplitude of fringes determined by intensity of said light and grating line lengths defined by said window and a phase of said fringes determined by said grating.

2. The optical phase mask of claim 1 wherein said light passed through said substrate impinges on an optical fiber, writing a fiber Bragg grating into a core of said fiber.

3. The optical phase mask of claim 1 wherein said diffraction grating is a chirped grating.

4. The optical phase mask of claim 1 wherein said diffraction grating is a sampled grating.

5. An optical phase mask embodying light amplitude information, said phase mask comprising:
   a substrate; and
   a diffraction grating defined on said substrate, said grating defining a polygonal boundary;
   wherein light passed through said substrate has a modulation amplitude of fringes determined by intensity of said light and transmittance of said substrate, and a phase of said fringes is determined by said grating.

6. The optical phase mask of claim 5 wherein said grating comprises lines having differing lengths, ends of said lines defining said boundary.

7. The optical phase mask of claim 6 wherein said boundary determines a total intensity transmitted through said grating and modulation amplitude of said fringes.

8. The optical phase mask of claim 5 wherein said light passed through said substrate impinges on an optical fiber, writing a fiber Bragg grating into a core of said fiber.

9. The optical phase mask of claim 5 wherein said diffraction grating is a chirped grating.

10. The optical phase mask of claim 5 wherein said diffraction grating is a sampled grating.

11. An optical phase mask embodying light amplitude information, said phase mask comprising:
    a substrate; and
    a plurality of diffraction grating regions defined on said substrate, said diffraction grating regions interleaved with a smooth surface of said substrate;
    wherein light passed through said substrate has an amplitude modulation of fringes determined by intensity of said light and transmittance of said substrate, and said fringes have a phase determined by said grating regions.

12. The optical phase mask of claim 11 wherein at least one of said plurality of gratings comprise lines having differing lengths.

13. The optical phase mask of claim 12 wherein said lines having differing lengths determine a total intensity transmitted through said plurality of gratings and a modulation amplitude of transmitted fringes.

14. The optical phase mask of claim 11 wherein said light passed through said substrate impinges on an optical fiber, writing a fiber Bragg grating into a core of said fiber.

15. The optical phase mask of claim 11 wherein at least one of said diffraction gratings is a chirped grating.

16. The optical phase mask of claim 11 wherein said diffraction grating is a sampled grating.

17. An optical phase mask embodying light amplitude information, said phase mask comprising:
    a substrate;
    at least one first diffraction grating defined on said substrate, said first grating comprising grating lines of differing lengths and having a transmission coefficient; and
    at least one second diffraction grating defined on said substrate, said second grating having a same transmission coefficient as said first grating;
    wherein light passed through said substrate has a modulation amplitude of fringes determined by intensity of said light, by said transmission coefficient and by said first grating line lengths, and a phase determined by said first grating.

18. The phase mask of claim 17 wherein said first and said second diffraction gratings are oriented perpendicularly.

19. The optical phase mask of claim 18 wherein each of said at least one diffraction gratings comprise a set of a plurality of diffraction gratings and said first diffraction grating set is interleaved with said second diffraction grating set.

20. The optical phase mask of claim 19 wherein said interleaved gratings are separated by gaps.

21. The phase mask of claim 17 wherein said first and said second diffraction gratings have different periods.

22. The optical phase mask of claim 21 wherein each of said at least one diffraction gratings comprise a set of a plurality of diffraction gratings and said first diffraction grating set is interleaved with said second diffraction grating set.

23. The optical phase mask of claim 22 wherein said interleaved gratings are separated by gaps.

24. The optical phase mask of claim 17 wherein said first at least one diffraction gratings comprises a first set of a plurality of diffraction gratings and, said second at least one diffraction gratings comprises a second set of a plurality of diffraction gratings, wherein said first diffraction grating set is interleaved with said second diffraction grating set.

25. The optical phase mask of claim 24 wherein said interleaved gratings are separated by gaps.

26. The optical phase mask of claim 17 wherein said light passed through said substrate impinges on an optical fiber, writing a fiber Bragg grating into a core of said fiber.

27. The optical phase mask of claim 17 wherein at least one of said diffraction gratings is a chirped grating.

28. The optical phase mask of claim 17 wherein said at least one of said diffraction grating is a sampled grating.

29. The optical phase mask of claim 17 wherein said gratings are separated by gaps.

30. An optical phase mask embodying light amplitude information, said phase mask comprising:
   a substrate; and
   a plurality of diffraction gratings defined on said substrate, each of said gratings having grating lines of equal length, said plurality of gratings comprising:
      a first set of at least one grating having a first transmission coefficient and a first phase; and
      a second set of at least one grating having a second transmission coefficient and a second phase;
   wherein light passed through said substrate has a modulation amplitude of fringes determined by intensity of said light, said transmission coefficients of said gratings and a difference between said first and second phases and said light passed through said substrate has a phase of said fringes determined by a sum of said phases of said gratings.

31. The optical phase mask of claim 30 wherein:
   said first set comprises one diffraction grating having grating lines of a first length; and
   said second set comprises two diffraction gratings, each of said gratings in said second set having grating lines of equal length and total grating line lengths of said gratings of said second set equal said first grating line lengths.

32. The optical phase mask of claim 31 wherein said gratings of second set are located adjacent to, and above and below, said grating of said first set.

33. The optical phase mask of claim 31 wherein said light passed through said substrate impinges on an optical fiber, writing a fiber Bragg grating into a core of said fiber.

34. The optical phase mask of claim 31 wherein at least one of said diffraction gratings is a chirped grating.

35. The optical phase mask of claim 31 wherein at least one of said diffraction gratings is a sampled grating.

36. The optical phase mask of claim 31 wherein gratings of said first set are separated from gratings of said second set by gaps.

37. The optical phase mask of claim 30 wherein each of said sets comprise a plurality of diffraction gratings having equal grating line lengths and said gratings of said first set are interleaved with gratings of said second set.

38. The optical phase mask of claim 37 wherein said light passed through said substrate impinges on an optical fiber, writing a fiber Bragg grating into a core of said fiber.

39. The optical phase mask of claim 37 wherein at least one of said diffraction gratings is a chirped grating.

40. The optical phase mask of claim 37 wherein at least one of said diffraction gratings is a sampled grating.

41. The optical phase mask of claim 37 wherein gratings of said first set are separated form gratings of said second set by gaps.

42. The optical phase mask of claim 30 wherein said first set comprises one diffraction grating and said second set comprises one diffraction grating, said gratings having equal grating line lengths and disposed adjacent to each other, separated by a centerline.

43. The optical phase mask of claim 42 wherein said light passed through said substrate impinges on an optical fiber, writing a fiber Bragg grating into a core of said fiber.

44. The optical phase mask of claim 42 wherein at least one of said diffraction gratings is a chirped grating.

45. The optical phase mask of claim 42 wherein at least one of said diffraction gratings is a sampled grating.

46. The optical phase mask of claim 30 wherein said light passed through said substrate impinges on an optical fiber, writing a fiber Bragg grating into a core of said fiber.

47. The optical phase mask of claim 30 wherein at least one of said diffraction gratings is a chirped grating.

48. The optical phase mask of claim 30 wherein at least one of said diffraction gratings is a sampled grating.

49. The optical phase mask of claim 30 wherein said gratings of said first set are separated from gratings of said second set by gaps.

50. The optical phase mask of claim 30 wherein said first set comprises one diffraction grating and said second set comprises one diffraction grating of equal grating line lengths, disposed adjacent to each other, separated by a gap.

51. An optical phase mask embodying light amplitude information, said phase mask comprising:
   a substrate; and
   a plurality of diffraction gratings defined on said substrate, said plurality of gratings comprising:
      a first set of at least one grating having a first phase and lines of varying lengths; and
      a second set of at least one grating having a second phase with a $\pi/2$ difference from said first phase and lines of varying lengths;
   wherein light passed through said substrate has a modulation amplitude of fringes determined by intensity of said light and relative grating line lengths of said first set and said second set through which said light passed, and said light passed through said substrate has a phase of said fringes determined by a sum of said phases of said gratings.

52. The optical phase mask of claim 51 wherein said first set and said second set each comprises one diffraction grating with differing grating line lengths, said gratings disposed adjacent to each other.

53. The optical phase mask of claim 51 wherein said first set comprises one diffraction grating and said second set comprises two diffraction gratings, said gratings of second set located adjacent to, and above and below, said grating of said first set.

54. The optical phase mask of claim 53 wherein said light passed through said substrate impinges on an optical fiber, writing a fiber Bragg grating into a core of said fiber.

55. The optical phase mask of claim 53 wherein at least one of said diffraction gratings is a chirped grating.

56. The optical phase mask of claim 53 wherein at least one of said diffraction gratings is a sampled grating.

57. The optical phase mask of claim 53 wherein gratings of said first set are separated from gratings of said second set by gaps.

58. The optical phase mask of claim 52 wherein at least one of said diffraction gratings is a chirped grating.

59. The optical phase mask of claim 52 wherein at least one of said diffraction gratings is a sampled grating.

60. The optical phase mask of claim 52 wherein gratings of said first set are separated from gratings of said second set by gaps.

61. The optical phase mask of claim 51 wherein each of said sets comprise a plurality of diffraction gratings and said gratings of said first set are interleaved with gratings of said second set.

62. The optical phase mask of claim 61 wherein said light passed through said substrate impinges on an optical fiber, writing a fiber Bragg grating into a core of said fiber.

63. The optical phase mask of claim 61 wherein at least one of said diffraction gratings is a chirped grating.

64. The optical phase mask of claim 61 wherein at least one of said diffraction gratings is a sampled grating.

65. The optical phase mask of claim 61 wherein gratings of said first set are separated from gratings of said second set by gaps.

66. The optical phase mask of claim 51 wherein said light passed through said substrate impinges on an optical fiber, writing a fiber Bragg grating into a core of said fiber.

67. The optical phase mask of claim 51 wherein at least one of said diffraction gratings is a chirped grating.

68. The optical phase mask of claim 51 wherein at least one of said diffraction gratings is a sampled grating.

69. The optical phase mask of claim 51 wherein gratings of said first set are separated from gratings of said second set by gaps.

70. The optical phase mask of claim 52 wherein said light passed through said substrate impinges on an optical fiber, writing a fiber Bragg grating into a core of said fiber.

71. A method for imparting a desired amplitude to light passed through an optical phase mask, said method comprising the steps of:
    defining a diffraction grating of parallel lines of varying lengths in a substrate;
    masking a portion of a surface of said substrate, defining a polygonal window around said diffraction grating, said window defining said lengths; and
    passing light through said substrate, whereby light passed through said substrate has a modulation amplitude of fringes determined by intensity of said light and said grating line lengths defined by said window and a phase of said fringes determined by said grating.

72. The method of claim 71 further comprising the step of impinging said light passed through said substrate on an optical fiber thereby writing a fiber Bragg grating into a core of said fiber.

73. The method of claim 71 wherein said diffraction grating is a chirped grating.

74. The method of claim 71 wherein said diffraction grating is a sampled grating.

75. A method for imparting a desired amplitude to light passed through an optical phase mask, said method comprising the steps of:
    defining a polygonal boundaried diffraction grating in a substrate; and
    passing light through said substrate to impart to said light a modulation amplitude of fringes determined by intensity of said light and a transmittance of said substrate and to impart a phase of said fringes determined by said grating.

76. The method of claim 75 further comprising the step of differing lengths of lines comprising said grating, ends of said lines defining said polygonal boundary.

77. The method of claim 76 wherein said boundary determines a total intensity transmitted through said grating and modulation amplitude of said fringes.

78. The method of claim 75 further comprising the step of impinging said light passed through said substrate on an optical fiber to write a fiber Bragg grating into a core of said fiber.

79. The method of claim 75 wherein said diffraction grating is a chirped grating.

80. The method of claim 75 wherein said diffraction grating is a sampled grating.

81. A method for imparting a desired amplitude to light passed through an optical phase mask, said method comprising the steps of:
    defining a plurality of diffraction grating regions on a substrate;
    interleaving said diffraction grating regions with a smooth surface of said substrate;
    passing light through said substrate, whereby light passed through said substrate has an amplitude modulation of fringes determined by intensity of said light and transmittance of said substrate, and said fringes have a phase determined by said grating regions.

82. The method of claim 81 wherein at least one of said plurality of gratings comprise lines having differing lengths.

83. The method of claim 82 wherein said lines having differing lengths determine a total intensity transmitted through said plurality of gratings and a modulation amplitude of transmitted fringes.

84. The method of claim 81 further comprising the step of impinging said light passed through said substrate on an optical fiber to write a fiber Bragg grating into a core of said fiber.

85. The method of claim 81 wherein at least one of said diffraction gratings is a chirped grating.

86. The method of claim 81 wherein at least one of said diffraction gratings is a sampled grating.

87. A method for imparting a desired amplitude to light passed through an optical phase mask, said method comprising the steps of:
    defining at least one first diffraction grating of lines of differing lengths in a substrate, said at least one first grating having a transmission coefficient;
    defining at least one second diffraction grating in said substrate, said at least one second grating having a same transmission coefficient as said first grating;
    passing light through said substrate to impart to said light a modulation amplitude of fringes determined by intensity of said light, by said transmission coefficient of said gratings and by said first grating line lengths, and a phase determined by said at least one first grating.

88. The method of claim 87 further comprising the step of impinging said light passed through said substrate on an optical fiber to write a fiber Bragg grating into a core of said fiber.

89. The method of claim 87 wherein at least one of said diffraction gratings is a chirped grating.

90. The method of claim 87 wherein at least one of said diffraction gratings is a sampled grating.

91. The method of claim 87 further comprising the step of separating said first and second diffraction gratings by gaps.

92. The method of claim 87 wherein said second at least one diffraction gratings comprises a plurality of diffraction gratings, wherein said first diffraction grating is interleaved with said second diffraction gratings.

93. The method of claim 87 further comprising the step of orienting said first at least one diffraction gratings and said second at least one diffraction gratings perpendicularly.

94. The method of claim 87 wherein said first and said second diffraction gratings have different periods.

95. A method for imparting a desired amplitude to light passed through an optical phase mask, said method comprising the steps of:

defining a plurality of diffraction gratings on a substrate, each of said gratings having grating lines of equal length, said plurality of gratings comprising:
a first set of at least one gratings having a first transmission coefficient and a first phase; and
a second set of at least one gratings having a second transmission coefficient and a second phase; and passing light through said substrate to impart in said light a modulation amplitude of fringes determined by intensity of said light, said transmission coefficients of said gratings and a difference between said first and second phases, and said light has a phase of said fringes determined by a sum of said phases of said gratings.

96. The method of claim 95 wherein said first set comprises one diffraction grating having grating lines of a first length, and said second set comprises two diffraction gratings, each of said gratings in said second set having grating lines of equal length and total grating line lengths of said gratings of said second set equal said first grating line lengths.

97. The method of claim 96 wherein said gratings of second set are located adjacent to, and above and below, said grating of said first set.

98. The method of claim 97 further comprising the step of separating said gratings by gaps.

99. The method of claim 95 further comprising the step of separating gratings of said first set are separated from gratings of said second set by gaps.

100. The method of claim 95 wherein each of said sets comprise a plurality of diffraction gratings with equal line lengths and said method farther comprises the step of interleaving gratings of said first set with gratings of said second set.

101. The method of claim 95 wherein said first set comprises one diffraction grating and said second set comprises one diffraction grating of equal width, and said method further comprising the steps of:

disposing said first set and said second set adjacent to each other; and separating said first set and said second set by a centerline.

102. The method of claim 95 wherein said first set comprises one diffraction grating and said second set comprises one diffraction grating of equal width, and said method further comprising the steps of:

disposing said first set and said second set adjacent to each other; and separating said first set and said second set by a gap.

103. The method of claim 95 further comprising the step of impinging said light passed through said substrate, on an optical fiber to write a fiber Bragg grating into a core of said fiber.

104. The method of claim 95 wherein at least one of said diffraction gratings is a chirped grating.

105. The method of claim 95 wherein at least one of said diffraction gratings is a sampled grating.

106. A method for imparting a desired amplitude to light passed though an optical phase mask, said method comprising the steps of:

defining a plurality of diffraction gratings on a substrate, said plurality of gratings comprising:
a first set of at least one grating having a first phase and lines of varying lengths; and
a second set of at least one grating having a second phase with a π/2 difference from said first phase and lines of varying lengths;

passing light through said substrate to impart in said light a modulation amplitude of fringes determined by intensity of said light and relative grating line lengths of said gratings of said first set and said second set through which said light passes and said light passed through said substrate has a phase of said fringes determined by a sum of said phases of said gratings.

107. The method of claim 106 further comprising the step of impinging said light passed through said substrate, on an optical fiber to write a fiber Bragg grating into a core of said fiber.

108. The method of claim 106 wherein at least one of said diffraction gratings is a chirped grating.

109. The method of claim 106 wherein at least one of said diffraction gratings is a sampled grating.

110. The method of claim 106 further comprising the step of separating gratings of said first set are separated from gratings of said second set by gaps.

111. The method of claim 106 wherein each of said sets comprise a plurality of diffraction gratings and said method further comprises the step of interleaving gratings of said first set with gratings of said second set.

112. The method of claim 106 wherein said first set and said second set each comprises one diffraction grating of differing widths, said method further comprising the step of disposing said first set and said second set adjacent to each other.

113. The method of claim 106 wherein said first set comprises one diffraction grating and said second set comprises two diffraction gratings, and said method further comprises the step of locating said gratings of second set adjacent to, and above and below, said grating of said first set.

* * * * *